United States Patent [19]

Wang

[11] 4,017,556

[45] Apr. 12, 1977

[54] POLYMERIC SUBSTRATES COATED WITH REACTION PRODUCT OF HYDROXY-TERMINATED URETHANE AND MELAMINE RESIN

[75] Inventor: Samuel S. Wang, Cheshire, Conn.

[73] Assignee: American Cyanamid Company, Stamford, Conn.

[22] Filed: Mar. 20, 1975

[21] Appl. No.: 560,416

[52] U.S. Cl. .................. 260/856; 260/850; 427/421; 427/429; 427/430 R; 428/411; 428/412; 428/421; 428/425; 428/502; 428/522; 428/523; 428/524; 428/538

[51] Int. Cl.$^2$ ........................ C08L 61/28

[58] Field of Search ............... 260/849, 856, 850

[56] References Cited

UNITED STATES PATENTS

| | | | |
|---|---|---|---|
| 3,384,606 | 5/1968 | Dieterich et al. | 260/849 |
| 3,542,718 | 11/1970 | Davis et al. | 260/849 |
| 3,626,023 | 12/1971 | Brizgys | 260/849 |
| 3,759,873 | 9/1973 | Hudak | 260/75 NK |
| 3,785,861 | 1/1974 | Tanimura et al. | 260/849 |
| 3,804,810 | 4/1974 | Fryd | 260/75 NK |
| 3,912,790 | 10/1975 | Chang et al. | 260/849 |

Primary Examiner—Murray Tillman
Assistant Examiner—Thurman K. Page
Attorney, Agent, or Firm—Frank M. Van Riet

[57] ABSTRACT

Articles of manufacture comprising polymer substrates coated with compositions of matter consisting of the acid catalyzed reaction product of (1) a urethane prepolymer having terminal hydroxy groups and produced from a diol of a molecular weight of 200 – 3,000, an organic diisocyanate and a polyhydric alcohol having 2 – 6 hydroxyl groups and (2) a polyalkyl ether of a polymethylol melamine, are disclosed.

10 Claims, No Drawings

POLYMERIC SUBSTRATES COATED WITH REACTION PRODUCT OF HYDROXY-TERMINATED URETHANE AND MELAMINE RESIN

BACKGROUND OF THE INVENTION

The use of polymeric materials such as polycarbonate resins for both home and industrial applications has increased tremendously in recent years. One of the most widely accepted applications of the polycarbonates, for example, has been in the field of optical lenses such as those used in the manufacture of eyeglasses, including safety glasses, and apparatus requiring lenses such as binoculars, microscopes and the like.

While the polycarbonates are excellent for these applications due to their excellent optical clarity and impact resistance, among other features, they are disappointing, as are many other polymers, in regard to their mar-resistance. The surfaces of products produced from the polycarbonates etc., therefore, are relatively easily scratched or otherwise marred, thereby rendering their lifetimes somewhat shorter than desired.

The tendency of polycarbonate lenses to suffer surface damage has been most recently overcome by coating the lenses with mar-resistant coatings, see, for example, U.S. Pat. No. 3,518,040.

SUMMARY

I have now found a novel article of manufacture comprising a polymeric substrate coated with a coating composition comprising a urethane prepolymer, an alkylated melamine/formaldehyde material and an acid catalyst. Theses articles of manufacture exhibit greatly increased mar-resistance, excellent clarity and excellent impact resistance compared to the uncoated substrates. Furthermore, the adhesiveness with which the coating is retained on the polymeric substrate is far superior to most available coating compositions.

Coatings derived from the reaction of alkylated melamine materials and hydroxyl-terminated urethane propolymers are not new per se, see U.S. Pat. No. 3,542,718, but the compositions, produced from the instant prepolymer which contains a sterically bulky hydroxy group at the chain ends, give a coating, the superior mar-resistance of which is entirely unexpected.

DESCRIPTION OF THE INVENTION INCLUDING PREFERRED EMBODIMENTS

As mentioned briefly above, the crux of the instant invention resides in a novel article of manufacture comprising a polymeric substrate coated with a coating composition produced from a urethane prepolymer, an alkylated melamine/formaldehyde material and an acid catalyst, which coated article can be used in such applications as glazing, safety lenses, display panels, furniture and the like.

The use of a sterically bulky polyhydric alcohol to form the urethane prepolymer end groups and the stepwise sequential preparation of the prepolymer result in a product having unique chemical properties, which when compounded into a coating composition and applied as a coating to non-mar-resistant polymeric substrates and cured, results in the novel articles of manufacture of the instant invention.

The urethane prepolymer is prepared by reacting one molar portion of a saturated diol having a molecular weight of from about 200 to about 3,000 with two molar portions of a saturated organic diisocyanate to produce an isocyanate terminated saturated urethane prepolymer which, in turn, is reacted, at a molar ratio of 1:2, respectively, with a monomeric, sterically bulky, polyhydric alcohol which contains 2 – 6 hydroxyl groups and which is free of oxyalkylene groups, to produce a urethane prepolymer having terminal hydroxy groups. This prepolymer, in turn, is then admixed with a polyalkyl ether of a polymethylolmelamine in the presence of an acid catalyst to form the coating useful in producing my novel coated articles of manufacture.

The prepolymer having terminal hydroxy groups conforms to the general formula

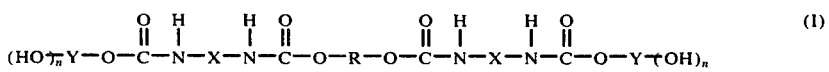

wherein
R is the reaction residue of a saturated diol having a molecular weight of 200–3,000,
X is the reaction residue of an organic diisocyanate,
Y is the reaction residue of a monomeric, sterically bulky, polyhydric alcohol of 4–18 carbon atoms containing no oxyalkylene groups, and $n$ is 1 to 5.

The saturated urethane prepolymer have terminal hydroxy groups described above is produced from diols such as the polyoxyalkylene adducts of diols and alkylene oxides such as ethylene oxide, propylene oxide, butylene oxide and mixtures thereof and the like. The diols useful in preparing these adducts include ethylene glycol, 1,2-propylene glycol, 1,3-propylene glycol, 1,2-butanediol, 1,4-butanediol, 1,6-hexanediol, hydroquinone, bisphenol A, and the like.

Typical polyoxyalkylene diols include polyethyleneether glycol, polypropyleneether glycol, polybutyleneether, glycol, polytetramethyleneether glycol, block copolymers, e.g., combinations and polypropyleneether and polyethyleneether glycols; poly-1,2-oxybutylene and polyethyleneether glycols; and poly-1,4-oxybutylene and polyethyleneether glycols; and random copolyether glycols prepared from blends, or sequential addition, of two or more alkylene oxides.

Thus, the polyoxyalkylene diols which can be employed in this process are polyoxyalkylene polymers which have an oxygen/carbon atom ratio from about 1:2 and 1:4 and preferably, an oxygen/carbon atom ratio from about 1:2.8 to 1:4 and no more than 2 terminal hydroxyl groups. The polyoxyalkylene diols generally have an average equivalent weight from about 200 to 3,000 and preferably have an average equivalent weight from about 500 to 2,000. Also diol blends such as a mixture of high molecular weight polyoxyalkylene diols can be used in preparing urethane prepolymers having good properties.

Polyoxyalkylene arylene diols which also have molecular weights ranging from about 200 to about 3,000 but which differ from the above-described polyoxyalkylene diols in having arylene radicals, such as phenylene, naphthylene and anthrylene radicals, either unsubstituted or substituted, e.g., with alkyl or aryl groups, and the like, in place of some of the alkylene radicals of said polyoxyalkylene diols may also be employed. Polyoxyalkylenearylene glycols of the type ordinarily used for this purpose will usually contain at least one alkylene ether radical having a molecular weight of about 200 for each arylene radical present.

Essentially linear polyesters containing two isocyanate-reactive hydroxyl groups constitute another class of reactive organic diols which may be employed in preparing urethane prepolymers used in the present invention. While the preparation of polyesters suitable for this purpose has been described in great detail in the prior art and forms not part of the present invention per se, it may be mentioned here by way of illustration that polyesters of this type may be prepared by the condensation of a dihydric alcohol, generally a saturated aliphatic diol such as ethylene glycol, propanediol-1,2, propanediol-1,3, butanediol-1,3, butanediol-1,4, pentanediol 1,2, pentanediol-1,5, hexanediol-1,3, hexanediol-1,6, diethylene glycol, dipropylene glycol, triethylene glycol, tetraethylene glycol, and the like, as well as mixtures of such diols with each other, and the like, with a dicarboxylic acid, e-caprolactone, or anhydride which is either saturated or which contains only benzenoid unsaturation, such as oxalic, malonic, succinic, glutaric, adipic, pimelic, suberic, azelaic, terephthalic, sebacic, malic, phthalic, cylohexanedicarboxylic and endomethylenetetrahydrophthalic acids, and the like, and their isomers, homologs, and other substituted derivatives, e.g., chloro derivatives. The linear polyesters use in preparing the urethane prepolymers also have molecular weights ranging from about 200 to about 3,000. In addition, they generally have relatively low acid numbers, e.g., acid numbers not appreciably in excess of about 60 and preferably as low as can be practicably obtained, e.g., 2 or less. Correspondingly, they have relatively high hydroxyl numbers, e.g., from about 30 to about 700. When preparing these polyesters, an excess of diol over dicarboxylic acid is generally used.

Nitrogen-containing diols may also be used a diol reactants. Among such materials there are included the polyesteramides conventionally employed in the preparation of urethane prepolymers, i.e., those having molecular weights ranging from about 200 to about 3,000, acid numbers ranging from about 60 as a maximum to as low as can be practicably obtained, e.g., 2 or less, and hydroxyl numbers ranging from about 30 to about 700.

As can be readily appreciated, mixtures of the various reactive organic diols described hereinabove may also be employed in preparing the urethane prepolymers of the present invention.

The organic diisocyanates which can be employed to produce the urethane propolymer used in the present invention include, for example, the aliphatic, cycloaliphatic and aromatic diisocyanates including m-xylene diisocyanate, methylenediisocyanate, tetramethylene diisocyanate, hexamethylene diisocyanate, 4,4'-methylenebis(cyclohexyl isocyanate), 4-chloro-m-phenylene diisocyanate, isophorone diisocyanate, o,p, or m-phenylenediisocyanate, trimethylhexamethylene diisocyanate, 4-t-butyl-m-phenylenediisocyanate, 4,4'-methylene bis(phenyl isocyanate), tolylene diisocyanate, 1,5-naphthalene diisocyanate, 4-methoxy-m-phenylene diisocyanate, biphenylene diisocyanate, cumene-2,4-diisocyanate, 3,3'-dimethyl-4,4'biphenylene diisocyanate, p,p'-diphenylene diisocyanate, 3,3'-dimethoxy-4,4'-biphenylene diisocyanate, mixtures thereof and the like.

The diol is preferably reacted with the diisocyanate utilizing a molar ratio of about 1:2, respectively, in the presence of a suitable catalyst such as an organotin compound, e.g., dibutyltin dilaurate, dibutyltin octoate and the like; a tertiary amine, e.g., triethylene diamine; an organolead compound, e.g., lead octoate and the like, at concentrations of from about 0.001% to about 0.1%, by weight, based on the total weight of the diol and diisocyanate. The reaction is allowed to proceed at a temperature of from about 60° C. to about 180° C. until the isocyanate terminated urethane prepolymer forms, i.e., from about 4 to about 24 hours.

The isocyanate terminated urethane prepolymer is then reacted at a temperature ranging from about 60° C. to about 120° C. for from about ½–9 hours, with a monomeric, sterically bulky, polyhydric alcohol containing 2–6 hydroxyl groups but free of oxyalkylene units, in a molar ratio of 1:2 respectively. By "monomeric" is meant that these alcohols contain no repeating unit of themselves or other polymeric building blocks such as those exhibited by reaction adducts of glycols with ethylene or propylene oxide. By "sterically bulky" is meant that the steric dimension of the alcohol molecule is greater than simple ethylene glycol or propylene glycol, i.e., it contains at least 4 but no more than 18 carbon atoms. Examples of alcohols which fit this description include 1,4-cyclohexane dimethanol, 1,4-butanediol, mannitol, trimethylol propane, trimethylol ethane, 1,1-cyclohexane dimethanol, hydrogenated bisphenol A, cyclohexane diol, neopentyl glycol, trimethylpentanediol, pentaerythritol, trimethylhexanediol and the like. The result of this second, sequential step is the production of a useful prepolymer having 1–10 terminal hydroxy groups.

As set forth above, the useful urethane prepolymer having terminal hydroxy groups is then completely admixed with a polyalkyl ether of a polymethylolmelamine to form a coating composition. Examples of these melamine materials encompass the dimethyl, diethyl, dipropyl, dibutyl, etc. ethers, the trimethyl, triethyl, tripropyl, tributyl, etc. ethers, the tetramethyl, tetraethyl, tetrapropyl, tetrabutyl, etc. ethers, the pentamethyl, pentaethyl, pentapropyl, pentabutyl, etc. ethers, and the hexamethyl, hexaethyl, hexapropyl, hexabutyl, etc. ethers of the dimethylol, trimethylol, tetramethylol, pentamethylol or hexamethylol melamines. Of course, mixed polyalkyl ethers such as the dimethyl, tetraethyl ethers, etc. of the polymethylol melamines may also be used. The preferred melamine is hexakismethoxymethylmelamine. These materials may be produced as set forth in U.S. Pat. Nos. 2,906,724; 2,918,452; 2,998,410; 2,998,411; 3,107,227; 3,422,076, etc. which patents are hereby incorporated herein by reference.

The proportion of polyhydroxy urethane prepolymer to melamine compound should range from about 5:1 to about 1:1, respectively. The mixture of polyhydroxy urethane propolymer and melamine compound is prepared at room temperature and ultimately cured, after having been coated on a suitable polymeric substrate, at a temperature of from about 50°–150° C. for 3–90 minutes to form my novel articles of manufacture.

From about 1.0% to about 10.0%, by weight, based on the weight of the polyhydroxyprepolymer and the melamine compound, of an acid catalyst is added to the polyhydroxy urethane prepolymer-melamine compound mixture before curing. Para-toluene sulfonic acid is preferred; however, xylene sulfonic acid, o- and m-toluene sulfonic acids, ethyl acid phosphate, n-butyl phosphoric acid, phosphoric acid, hydrochloric acid and the like can also be used.

While the use of a solvent is not essential in the sequential step production of the polyhydroxy urethane prepolymer or the addition of the melamine compound thereto, the use of a solvent is preferred both in the production of the prepolymer composition and in its use as coatings. Useful solvents should be sufficiently low boiling that they will vaporize from the composition when it is coated on the polymeric substrate but high enough boiling that they will not vaporize out of the reaction kettle when the composition is being prepared. Examples of suitable solvents include ethyl acetate, ethanol, methanol, cellosolve, butanol-cellosolve blends, xylene, toluene, butane, 2-ethoxyethyl acetate, methoxyethyl acetate, butoxybutyl acetate, amyl acetate, and other similar esters, ketones, chlorinated compounds, dioxane and the like. A practical range of solids in the solvent for coating purposes is between about 5% and 90% solids.

The resultant coating composition may be applied to the polymeric support by conventional means such as by brushing, spraying, dipping or coating with a doctor blade.

The polymeric materials which may be coated with the coating compositions discussed above include the polycarbonates, polyacrylates such as polymethyl methacrylate, polysulfones, phenoxy polymers, polyvinyl chloride, polyolefins such as polyethylene, polypropylene and the like. In general, any polymeric material whose surface requires mar-resistance improvement can be coated with the coating composition formed from the hydroxy terminated urethane prepolymer, the melamine compound and the acid catalyst to produce my novel articles of manufacture.

The coatings should be applied to these polymeric materials at a thickness ranging from about 0.01 mil to 1.0 mil.

The following examples are set forth for purposes of illustration only and are not be be construed as limitations on the present invention except as set forth in the appended claims. All parts and percentages are by weight unless otherwise specified.

EXAMPLE 1

Under a dry nitrogen blanket, into a suitable reaction vessel, is charged a mixture of 49.5 parts of polytetramethylene ether glycol having a molecular weight of about 660, and 50.5 parts of polytetramethyleneether glycol having a molecular weight of about 2,000, dissolved in 152.0 parts of ethyl acetate, 52.0 Parts of 1,4-methylenebis(cyclohexyl isocyanate) and 2.0 parts of dibutyltin dilaurate (1% in ethyl acetate) are added. The resultant mix is heated at 70° C. for 16 hours to form an isocyanate terminated polyol urethane.

To the urethane prepolymer are added 30.0 parts of 1,4-cyclohexanedimethanol which has been melted at 95° C. and dried for 4 hours at that temperature before use. Heating is effected at 70° C. under nitrogen for 6 hours to produce the corresponding dihydroxy terminated urethane prepolymer.

To produce a coating composition from this useful prepolymer, 50.0 parts of the dihydroxy urethane prepolymer, 10.0 parts of hexakismethoxymethyl melamine, 20.0 parts of ethyl hydroxyethylether, 20.0 parts of methanol and 1.0 part of p-toluenesulfonic acid are thoroughly admixed and applied, at about 0.5 mil, to cleaned polycarbonate (PC) and polymethyl methacrylate (PMMA) substrates by dip coating. The coated substrates are drained for 30 minutes and the coated PC is then cured at 125° C. for 45 minutes while the PMMA is cured at 95° C. of 2 hours. The results are set forth in Table I below.

EXAMPLE 2

120.0 parts of the "dihydroxy" urethane prepolymer of Example 1, 80.0 parts of hexakisemthoxymethyl melamine, 160.0 parts of a 4:1 butanol-ethylhydroxyethyl ether mixture, 4.8 parts of xylene, 1.0 parts of a commercially available leveling agent and 3.0 parts of p-toluene sulfonic acid are thoroughly mixed and applied to clean polycarbonate and polymethyl methacrylate substrates by dip coating. The substrates are drained 18 minutes and cured as specified in Example 1. The results are also set forth in Table I, below.

EXAMPLE 3

Into a suitable reaction vessel are charged 93.0 parts of polytetramethylene ether glycol having a molecular weight of about 620 and 100.0 parts of polytetramethylene ether glycol having a molecular weight of about 2,000. The glycols are charged as a solution in 152.0 parts of toluene under a nitrogen blanket. To the solution are added 104.0 parts of 1,4-methylenebis(cyclohexane isocyanate) and 4.0 parts of dibutyltin dilaurate (1% in ethyl acetate). The resultant reaction media is heated, with stirring, at 70° C. for 5 hours to produce a urethane prepolymer.

To the urethane prepolymer are than added 60.0 parts of 1,4-cyclohexanedimethanol (melted and dried as in Example 1) with stirring. The media is heated at 70° C. under nitrogen for 1-¼ hours, 152.0 parts of butanol are added and the mix is stirred until homogeneous.

The resulting hydroxy terminated urethane prepolymer is then formulated into a coating composition and coated onto polycarbonate and polymethyl methacrylate substrates as set forth in Example 1. The results are set forth in Table I, below.

EXAMPLE 4

Under a dry nitrogen blanket are charged, to a suitable reaction vessel, 155.0 parts of polytetramethylene ether glycol having a molecular weight of about 620, and 1,500.0 parts of polytetramethylene ether glycol having a molecular weight of about 2,000, dissolved in 760.0 parts of toluene. To the solution are added 520 parts of 1,4-methylenebis(cyclohexane isocyanate) and 20.0 parts of dibutyltin dilaurate (1% in ethyl acetate). The resultant mix is heated with stirring at 70° C. for 5 hours and 300.0 parts of 1,4-cyclohexanedimethanol (melted at 95° C. and dried 4 hours) are added thereto with stirring. Heating is continued at 70° C. under nitrogen for 1-¼ hours. Butanol is then added (1565.0 parts) and the resultant mix is stirred until homogeneous.

The so-produced hydroxy terminated urethane prepolymer is then formulated into a coating composition and coated onto polycarbonate and polymethyl methacrylate substrates as described in Example 1. The results are set forth in Table I, below.

TABLE I

| Coating of Example No. | MAR-RESISTANCE** | |
|---|---|---|
| | Polymethyl Methacrylate | Polycarbonate |
| — | Very Poor* | Very Poor* |
| 1. | Excellent | Excellent |
| 2. | " | " |
| 3. | " | " |
| 4. | " | " |

*no coating

**rating is based on the number of rings inflicted on the coated surface by a commercially accepted mar tester.

| Excellent | <3 rings |
|---|---|
| Good | 4 – 7 rings |
| Fair | 8 – 15 rings |
| Poor | 16 – 29 rings |
| Very Poor | >30 rings |

EXAMPLES 5 –11
(Comparative)

Following the coating procedure of Example 1, polymethyl methacrylate and polycarbonate substrates are each coated with a coating composition formulated as set forth in the following table. In each instance, the melamine compound is hexakismethoxymethyl melamine and the catalyst is p-toluene sulfonic acid (20% in isopropanol). The results of the mar tester test are set forth in Table II, below.

cyclohexane isocyanate) to produce an isocyanate terminated prepolymer. One mole of the prepolymer is then reacted with 2.0 moles of polytetramethylene ether glycol having a molecular weight of 660. The resultant hydroxy terminated urethane prepolymer is then formulated into a coating composition according to claim 1. When the resultant composition is coated onto polymethyl methacrylate and polycarbonate substrates and cured, the mar tester results are determined to be poor.

EXAMPLE 13

The procedure of Example 1 is again followed except that the polytetramethylene ether glycol of 2,000 molecular weight is omitted. 73.5 parts of the resultant hydroxy terminated urethane prepolymer, 26.5 parts of hexakismethoxymethyl melamine and 2.65 parts of p-toluene sulfonic acid are used to produce the coating composition. The composition is coated from a 24% solids mixture of ethyl acetate/hydroxyethyl ether/methanol/ethanol, 1.2/1.0/1.0/1.0. The mar tester results are determined to be good.

EXAMPLE 14

The procedure of Example 1 is again followed except the 660 molecular weight polytetramethylene ether glycol is omitted. A coating composition is formulated as in Example 13. The mar tester results are indicated as excellent.

TABLE II

| Example | Coating System (Polyol) | Parts by Weight Melamine/Polyol/Cat. | MAR-RESISTANCE | |
|---|---|---|---|---|
| | | | Polymethyl Methacrylate | Polycarbonate |
| 5 | Ethoxylated Bisphenol A | 30/70/3; 39% solids in isopropanol/hydroxy ethyl ether - 67/83 | Poor | Poor |
| 6 | Toluene Diisocyanate-dipropylene glycol adduct NCO/OH=1.0/2.1 | 30/70/3; 30% solids in isopropanol/hydroxyethyl ether - 50/50 | Poor | Poor |
| 7 | — | 100/—/10; 29% solids in isopropanol/hydroxyethyl ether - 50/50 | Fair | Fair |
| 8 | Methylene bis(cyclohexane isocyanate)&polycaprolactone polyol reaction product prepared in presence of dibutyl tin laurate cat.—NCO/OH= 3.1/1.0-Product air dried 1 wk. at room temp. | —/100/0.5; 30% solids in hydroxyethyl ether acetate/ethyl acetate- 37.6/62.4 | Poor | Poor |
| 9 | Polycaprolactone triol-molecular weight 540; hydroxyl number 310 | 30/75/3; 30% solids in hydroxyethyl ether/ethanol/methanol 1/1/1 | Fair | Fair |
| 10 | Polycaprolactone triol-MW 540; hydroxyl number 310 reacted with methylenebis-(cyclohexane isocyanate) NCO/OH=1.0/3.0 | 28.6/71.4/2.86; 28% solids in ethyl acetate/hydroxyethyl ether/methanol/ethanol 2.5/2.0/2.0/2.0 | Poor | Poor |
| 11 | Polytetramethylene ether glycol/methylenebis(cyclohexane isocyanate) adduct NCO/OH=1.0/2.0 | 30/70/3; 30% solids in isopropanol/hydroxyethyl ether 50/50 | Poor | Poor |

EXAMPLE 12
(Comparative)

In order to show the criticality of the sequential order of addition of the urethane prepolymer components as set forth in Example 1, 1.0 mole of 1,4-cyclohexane dimethanol is reacted with 2.0 moles of methylenebis(-

EXAMPLE 15 –20

The procedure of Example 1 is again followed except that the diol, diisocyanate, catalyst, sterically bulky polyhydric alcohol, curing catalyst and polymeric substrate are varied. The results are set forth in Table III, below.

TABLE III

| EXAMPLE | DIOL | DIISOCYANATE | CATALYST | POLYHYDRIC ALCOHOL | CURING CATALYST | SUBSTRATE | MAR-RESISTANCE |
|---|---|---|---|---|---|---|---|
| 15 | Polyethyleneether | Tolylene Diiso- | Lead Octoate | 1,4-butanediol | Xylene Sul- | Polyethylene | Good |

TABLE III-continued

| EXAMPLE | DIOL | DIISOCYANATE | CATALYST | POLYHYDRIC ALCOHOL | CURING CATALYST | SUBSTRATE | MAR-RESISTANCE |
| --- | --- | --- | --- | --- | --- | --- | --- |
| 16 | Polycaprolactone Polyol - MW 540 | Glycol - MW 238 cyanate Hexamethylene Diisocyanate | " | Pentaerythritol | fonic Acid " | Polyvinyl Chloride | Good |
| 17 | Polypropyleneether Glycol - MW 1178 | 1,5-naphthalene Diisocyanate | " | 1,1-cyclohexane dimethanol | Ethyl Acid Phosphate | Polysulfone | Excellent |
| 18 | Bisphenol A - Ethylene oxide adduct - MW 2800 | 4-methoxy-m-Phenylene Diisocyanate | Triethylene Diamine | Hydrogenated Bisphenol A | Hydrochloric Acid | Polypropylene | Excellent |
| 10 | Hydroxy Terminated Polyethylene Glycol Adipate - MW 1700 | p-Phenylene Diisocyanate | " | Trimethylol Propane | p-toluene Sulfonic Acid | Polycarbonate | Excellent |
| 20 | Hydroxy Terminated Polypropylene Glycol Terephthalate MW 870 | Isophorone Diisocyanate | Dibutyl Tin Octoate | Mannitol | " | " | Good |

I claim:

1. An article of manufacture comprising a polymeric substrate having a mar-resistant coating thereon, said coating consisting essentially of the acid catalyzed reaction product of a mixture of (1) and (2), in an amount ranging from about 5:1 to about 1:1, respectively, in which
   1. is a saturated urethane prepolymer having terminal hydroxy groups which is the reaction product of materials consisting essentially of a mixture of (a) and (b), at a molar ratio of 1:2, respectively, in which
      a. is an isocyanate-terminated urethane which is the reaction product of a mixture consisting essentially of (I) and (II), at a molar ratio of 1:2, respectively, in which
         i. is a saturated diol having a molecular weight of from about 200 to about 3000, and
         ii. is a saturated organic iso- cyanate, and
      b. is a monomeric, sterically bulky, polyhydric alcohol containing 2–6 hydroxyl groups and being free of oxyalkylene units and
   2. is a polyalkyl ether of a polymethylol melamine.

2. A composition according to claim 1 wherein said (I) is a polytetramethyleneether glycol.

3. A composition according to claim 1 wherein said (II) is methylene bis (cyclohexane isocyanate).

4. A composition according to claim 1 wherein said (b) is 1,4-cyclohexane dimethanol.

5. A composition according to claim 1 wherein said substrate is a polycarbonate resin.

6. A process for the production of the article of manufacture of claim 1 which comprises
   A. coating a polymeric substrate with a coating composition consisting essentially of a mixture of (1), (2) and (3), the ratio of (1) : (2) ranging from about 5:1 to about 1:1, respectively, in which
      1. is a saturated urethane prepolymer having terminal hydroxy groups which is the reaction product of a mixture of (a) and (b), at a molar ratio of 1:2, respectively, in which
         a. is an isocyanate-terminated urethane which is the reaction product of a mixture consisting essentially of (I) and (II), at a molar ratio of 1:2, respectively, in which
            I. is a saturated diol having a molecular weight of from about 200 to about 3000, and
            II. is a saturated organic diisocyanate and
      3. is a monomeric, sterically bulky, polyhydric alcohol containing 2-6 hydroxyl groups and being free of oxyalkylene units
      2. is a polyalkyl ether of a polymethylol melamine and
      3. is an acid catalyst, and
   B. curing the resultant coating.

7. A method according to claim 6 wherein said (I) is a polytetramethyleneether glycol.

8. A method according to claim 6 wherein said (II) is methylene bis(cyclohexane isocyanate).

9. a method according to claim 6 wherein said (b) is 1,4-cyclohexane dimethanol.

10. A method according to claim 6 wherein said substrate is a polycarbonate resin.

* * * * *